United States Patent
Fukushima

(10) Patent No.: US 6,334,924 B1
(45) Date of Patent: Jan. 1, 2002

(54) METHOD OF MANUFACTURING OPTICAL FILTER

(75) Inventor: Nobuhiro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/216,706

(22) Filed: Dec. 21, 1998

(30) Foreign Application Priority Data

Jul. 28, 1998 (JP) .......................................... 10-212664

(51) Int. Cl.⁷ .............................................. B32B 31/00
(52) U.S. Cl. ..................... 156/264; 118/35; 428/426; 427/164; 427/165; 427/289; 359/589; 359/590; 359/890; 359/891; 156/103; 156/106; 156/99; 156/182
(58) Field of Search ................................. 156/264, 103, 156/106, 182; 359/890, 891, 589, 590; 118/35; 428/426; 427/164, 165, 289

(56) References Cited

U.S. PATENT DOCUMENTS 4,370,025 A * 1/1983 Sato et al. .................. 359/590

5,618,371 A * 4/1997 Sing ............................ 156/264

FOREIGN PATENT DOCUMENTS

JP          64-31485          2/1989

* cited by examiner

*Primary Examiner*—Linda Gray
(74) *Attorney, Agent, or Firm*—Staas & Halsey, LLP

(57) ABSTRACT

The present invention has an object to provide a manufacturing method of readily realizing an optical filter having a flat transmission characteristic and a superior cutoff characteristic relative to adjacent bands. To this end, with the manufacturing method of the present invention, a bandpass filter consisting of a dielectric multilayer coating is formed on one plane of a transparent substrate, and an antireflection coating is formed on the other plane of the substrate. The substrate is then divided into a plurality of segments, and adjacent two segments are selected and adhered to each other by a transparent adhesive with band-pass filter surfaces of these segments facing to each other, while interposing a glass spacer between the band-pass filter surfaces, to thereby obtain an optical filter.

6 Claims, 6 Drawing Sheets

BAND-PASS FILTER

METHOD OF MANUFACTURING OPTICAL FILTER

BACKGROUND OF THE INVENTION (1) Field of the Invention

The present invention relates to a method of manufacturing an optical filter adapted to selectively transmit a light of specific wavelength, and more particularly to a method of manufacturing an optical filter formed with dielectric multilayer coatings.

(2) Related Art

There have been known a variety of optical filters for extracting a light of specific wavelength. As representative ones, such as those adopting a dielectric multilayer coating are utilized mostly. Generally, these optical filters adopting a dielectric multilayer coating are manufactured by alternately evaporating, onto a substrate glass, materials having different refractive indices such as $TiO_2$ and $SiO_2$, thereby forming a multiple interference coating (dielectric multilayer coating) by 50 to 100 layers. As the number of layers in the dielectric multilayer coating is increased, this type of optical filter is to have a relatively flat transmission characteristic and a sharply changing cutoff characteristic.

Further, as optical filters having a high resolving power, there have been known those elements such as called "Fabry-Perot interferometer (Fabry-Perot etalon, or simply etalon)". Generally, etalon is manufactured by applying coatings having high reflectance onto the side faces of a plane-parallel plate.

Meanwhile, as a method of achieving large-capacitance of optical transmission system, attention has been directed to a wavelength-division multiplexing (WDM) optical transmission system in which two or more optical signals having wavelengths different from each other are multiplexed and transmitted in a single transmission path. In this WDM optical transmission system, since there are transmitted a plurality of WDM optical signals having different wavelengths arranged with very narrow wavelength intervals, there is required an optical filter having a high resolving power with a relatively flat transmission characteristic and a sharply changing cutoff characteristic, so as to select an optical signal of a specific wavelength from these WDM optical signals.

However, although the aforementioned conventional optical filters adopting dielectric multilayer coatings are supposed to realize a flat transmission characteristic and a high cutoff characteristic, by increasing the number of the layers as mentioned above, the increase in the number of layers undergoes a predetermined limit such as due to restriction in actual manufacturing. Thus, it has been practically difficult to manufacture an optical filter adopting a dielectric multilayer coating, having both of a flat transmission characteristic and a high cutoff characteristic.

Further, the conventional etalons generally have a higher resolving power as compared to the optical filters adopting dielectric multilayer coatings. However, such etalons are problematic in that they have less flatness of transmission characteristic and have a deteriorated cutoff characteristic relative to adjacent bands. It has been also problematic that the yield of etalons having a high resolving power is low, since it has been difficult to form reflective coatings having uniform characteristics on the side faces of the plane-parallel plate.

SUMMARY OF THE INVENTION

The present invention has been carried out in view of the aforementioned points, and it is therefore an object of the present invention to provide a manufacturing method of readily realizing an optical filter having a flat transmission characteristic and a superior cutoff characteristic relative to adjacent bands.

To this end, with one embodiment of the present invention, there is provided a method of manufacturing an optical filter comprising of two band-pass filters consisting of dielectric multilayer coatings, the optical surfaces of the filters being substantially parallelly arranged to each other, comprising: a dielectric multilayer coating forming step of forming a band-pass filter coating consisting of a dielectric multilayer coating, on one plane of a transparent substrate; a dividing step of dividing said substrate formed with said band-pass filter coating consisting of the dielectric multilayer coating, into a plurality of segments; and an adhering step of adhering those two segments which are selected from said plurality of segments of said substrate, by means of a transparent adhesive, so that respective surfaces of said band-pass filter coatings consisting of the dielectric multilayer coatings of said two segments are faced to each other and are rendered to be substantially parallel to each other with a predetermined distance.

According to such a manufacturing method, the band-pass filter coating consisting of a dielectric multilayer coating is formed on the substrate in a single step, the substrate is divided, and the surfaces of the segments applied with the dielectric multilayer coating are adhered to manufacture an optical filter. This optical filter corresponds to what is obtained by forming band-pass filters instead of reflective coatings to be applied to a conventional etalon, thereby enabling provision of an optical filter having a flat transmission characteristic and a superior cutoff characteristic.

It is preferred that the adhering step in the abovementioned manufacturing method selects those adjacent two segments from the plurality of segments of the substrate divided by the dividing step. By selecting and adhering those adjacent segments of dielectric multilayer coatings formed in the same step, there are combined two band-pass filters having uniform characteristics.

Further, the abovementioned manufacturing method may further comprise an antireflection coating forming step of forming an antireflection coating on the other plane of the substrate, wherein the dividing step divides the substrate formed with the band-pass filter coating consisting of the dielectric multilayer coating and formed with the antireflection coating, into the plurality of segments. As a concrete example, the adhering step may adhere the selected two segments with a transparent thin plate interposed therebetween, and also it is preferable to set the distance between the band-pass filter coatings consisting of dielectric multilayer coatings of the selected two segments, to be equal to or less than 100 μm.

With another embodiment of the present invention, there is provided a method of manufacturing an optical filter constituted of two band-pass filters consisting of dielectric multilayer coatings, the optical surfaces of the filters being substantially parallelly arranged to each other, comprising: a dielectric multilayer coating forming step of forming on a front surface of a transparent substrate a band-pass filter coating consisting of a dielectric multilayer coating rendered to have a grading characteristic concerning a transmission wavelength, and forming on a back surface of the transparent substrate a band-pass filter coating consisting of another dielectric multilayer coating rendered to have a grading characteristic in a direction perpendicular to that of the grading characteristic of the band-pass filter coating formed on the front surface; and a cutting step of cutting out a segment located at a specific area of the substrate formed with the band-pass filter coatings consisting of the dielectric multilayer coating at the front and back surfaces thereof, respectively.

According to such a manufacturing method, two band-pass filter coatings consisting of two dielectric multilayer coatings having grading characteristics concerning transmission wavelengths are formed on the front and back surfaces of the substrate, respectively, such that the grading directions of the band-pass filter coatings are rendered to be perpendicular to each other. As a result, those segments of band-pass filters of uniform characteristics formed on the front and back surfaces, are distributed along a specific direction. Thus, there can be obtained an optical filter having an appropriate transmission characteristic, by cutting out a segment located at the specific area.

Preferably, the dielectric multilayer coating forming step in the abovementioned manufacturing method forms the band-pass filter coatings consisting of dielectric multilayer coatings on the front and back surfaces of the substrate having a thickness of equal to or less than 100μm.

Further objects, features and advantages of the present invention will become more apparent from the following description of preferred embodiments when read in conjunction with the accompanying drawings.

DETAILED DESCRIPTION OF THE INVENTION

There will be described hereinafter the embodiments according the present invention, with reference to the accompanying drawings.

Figure 1:
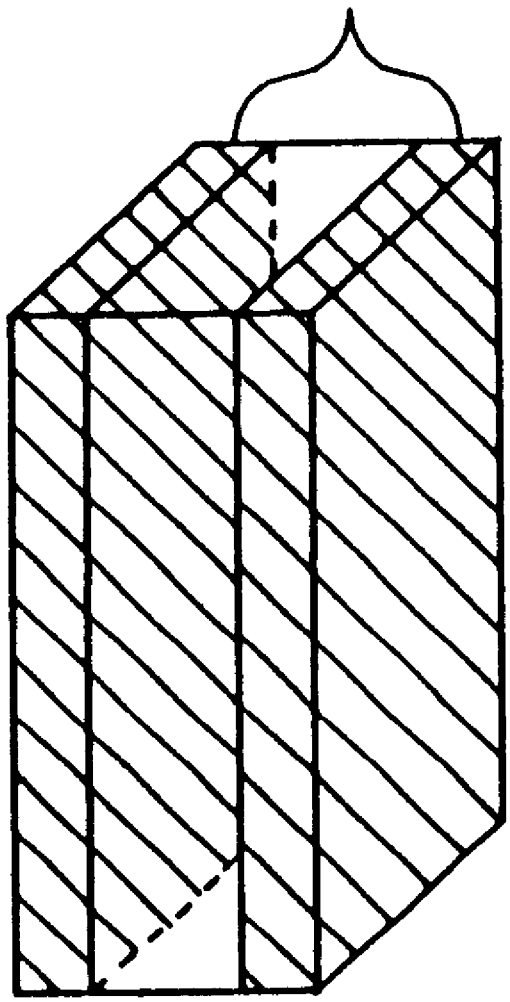
FIG. 1 is a schematic view showing a basic construction of an optical filter manufactured according to a manufacturing method of the present invention.

FIG. 1 is a perspective view showing a basic construction of an optical filter manufactured according to the manufacturing method of the present invention.

In FIG. 1, this optical filter is provided by arranging two band-pass filters each consisting of a dielectric multilayer coating, respectively, such that respective optical surfaces become substantially parallel to each other. This construction is equivalent to what is manufactured by forming dielectric multilayer coatings instead of reflective coatings to be applied to the both surfaces of a plane-parallel plate of a conventional etalon. This construction can be also regarded as being identical with that of an optical filter obtained by laminating two dielectric multilayer coatings, with a predetermined distance. Each of the present band-pass filters is to consist of a multiple interference coating formed by alternately laminating such as $TiO_2$ and $SiO_2$ having different refractive indices, similarly to a dielectric multilayer coating which has been conventionally used.

If it is intended to manufacture an optical filter having such a construction by laminating two dielectric multilayer coatings, since an extremely large number of layers are to be formed on one substrate, it could be hardly realized due to restriction in actual manufacturing as noted above. Even if it is enabled to form such a large number of layers, it is then difficult to form two dielectric multilayer coatings having uniform characteristics, rendering it difficult to manufacture optical filters having desired characteristics uniform to each other, with an excellent yield. Further, even if it is intended, similarly to the manufacture of conventional etalons, to form band-pass filters onto the both surfaces of a plane-parallel plate, it is difficult to form band-pass filters having uniform characteristics, onto such both surfaces, so that this also results in a manufacturing method of optical filter with a low yield.

As such, one method of manufacturing an optical filter according to the present invention is to form a dielectric multilayer coating (band-pass filter) onto a substrate in a single step, to divide the substrate, and to mutually adhere the surfaces applied with the dielectric multilayer coatings.

FIGS. 2(A) to 2(E) are perspective views showing external appearances of products at respective steps in the manufacturing method.

Figure 2:
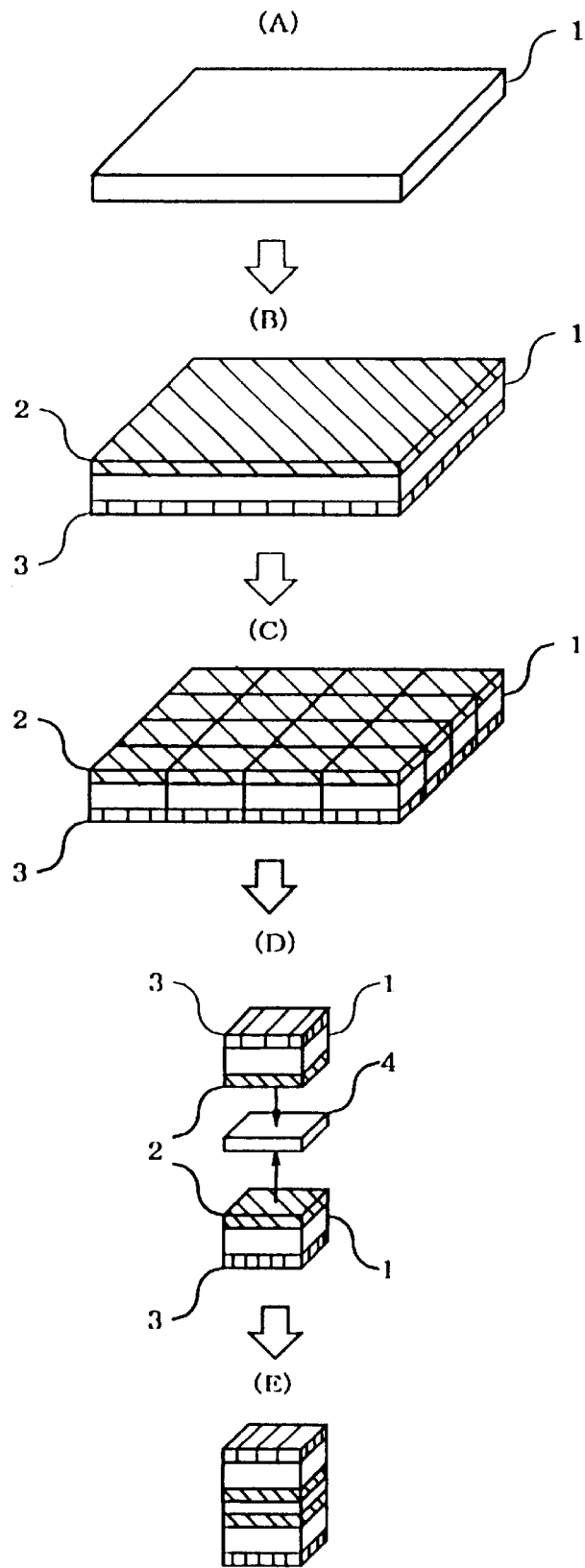
FIGS. 2(A) to 2(E) are perspective views showing external appearances of products at respective steps, in a manufacturing method according to an embodiment of the present invention.

Firstly, as shown in FIG. 2(A), there is prepared a substrate 1 which is substantially transparent in a wavelength range to be used. The substrate 1 is then formed with a band-pass filter 2 consisting of a dielectric multilayer coating having 50 to 100 layers, on one plane of substrate 1, and formed with an antireflection coating (AR coating) 3 on the other plane. FIG. 2(B) shows the substrate 1 formed with the band-pass filter 2 on its upper surface and the antireflection coating 3 on its lower surface.

The substrate 1 formed with the band-pass filter 2 and antireflection coating 3 is then divided. FIG. 2(C) shows a situation that the substrate 1 is divided such as into 16 segments.

Further, two of the dividedly obtained segments are selected and adhered to each other, with their band-pass filter surfaces facing to each other. By selecting adjacent segments, it becomes possible to combine band-pass filters 2 having mutually uniform characteristics. This takes into consideration that any dielectric multilayer coating formed even in a single process has dispersion of characteristics depending on its positions, but those segments of the coating which are relatively adjacent to each other will have similar characteristics.

FIG. 2(D) shows one example in which the segments are adhered by means of an adhesive which is substantially transparent in the wavelength range to be used, while interposing a glass spacer 4 between the respective band-pass filter surfaces of the segments. It is preferable to set a thickness of the glass spacer 4 to be approximately 50 μm, and to set the distance between the band-pass filters through the glass spacer 4 and adhesives to be equal to or less than 100 μm. As the adhesive, such as EPOTEC 353ND may be used.

In the above adhering method, it might be difficult to maintain the parallelism between the band-pass filter surfaces with high precision (such as with a second unit). Nonetheless, it has been confirmed that the optical filter according to the present invention will fully function even when the precision of parallelism is in the order of 1 to 2 minutes. Generally, any etalon is required to have extremely strict parallelism, because the light will reciprocate between two reflective coatings so many times. However, the number of times of light reciprocation is less in an etalon having low finesse as described later, and the reflectance in the transmission band in the present embodiment is extremely low, so that the light can be regarded as not reciprocating when equivalently considered. Namely, since the reflectance in the practical band is 50% at the utmost even at a sloping part of the wavelength characteristic, the requirement of parallelism is not so strict, so that the adhesion such as described above will satisfactorily achieve the intended purpose.

Although the band-pass filter surfaces are adhered to each other while interposing the glass spacer 4 therebetween in the above method, these surfaces may be directly adhered to each other with an adhesive by omitting the glass spacer 4. In such a case, it is possible to obtain higher parallelism between the band-pass filter surfaces, than the case of interposing glass spacer 4.

As shown in FIG. 2(E), the thus manufactured optical filter presents a configuration having antireflection coatings 3 applied onto the upper and lower surfaces, respectively, and, at the intermediate part, two band-pass filters 2 which have uniform characteristics and arranged substantially parallelly to each other via glass spacer 4 and adhesives.

There will be described hereinafter an optical characteristic of the present optical filter.

In the present optical filter obtained by forming band-pass filters consisting of dielectric multilayer coatings instead of reflective coatings to be applied to the both surfaces of a conventional etalon, the reflectance near the transmission wavelength of the band-pass filter is extremely low, i.e., equal to or lower than 10% (finesse is low, as etalon), so that the present optical filter functions as the transmission band of the band-pass filters with a higher transmissivity, substantially without functioning as an etalon.

Meanwhile, in the wavelength range deviating from the central transmission wavelength of the band-pass filter, the band-pass filter exhibits gradually higher reflectance so that the finesse as etalon correspondingly increases gradually. Further, in a range near the central wavelength as etalon (generally, this central wavelength does not coincide with a central wavelength of a band-pass filter, but it is supposed here that parameters are appropriately adjusted to render both wavelengths to coincide with each other), the transmissivity becomes high, while the transmissivity suddenly becomes low as deviating from the central wavelength. The gradient of the transmission wavelength characteristic at this time is far larger than that of a conventional dielectric multilayer coating type filter, so that the cutoff characteristic relative to the adjacent bands becomes superior.

Physically, the present optical filter can be expressed as an etalon the finesse of which continuously varies depending on wavelengths. As well known, finesse largely depends on the reflectance of both ends, so that finesse is high with high reflectance, and is low with low reflectance, the relationship of which will be represented as follows.

Finesse=$\pi F^{1/2}/2$ wherein $F=4R/(1-R)^2$, and R is reflectance.

There will be described hereinafter the concrete operations of the present optical filter, about three ranges of the wavelength band.

Firstly, in the transmission band of the band-pass filters, the present optical filter operates as an etalon having extremely low finesse. Substantially, there is less difference as compared to an optical characteristic of a flat plate applied with an antireflection coating. Since finesse is low, the transmission bandwidth becomes in the order of half of free spectral range (FSR). The transmission bandwidth of the optical filter becomes larger than a half bandwidth of transmission band of the band-pass filters, when supposing that the distance (gap distance) between the two band-pass filters is equal to or less than 100 μm, thus becomes a level which is never affected by a deviation of transmissivity caused by an etalon effect.

Secondly, in the cutoff bands of the band-pass filters, the present optical filter operates as an etalon having high finesse, so that cutoff effects are caused not only as a band-pass filter but also as an etalon. At this time, it is considered that extremely narrow transmission bands appear within the cutoff bands, due to a phase difference between the band-pass filters. Nonetheless, reflectance of the band-pass filters at the cutoff bands is typically equal to or larger than 99.9%, and the finesse as etalon is extremely high, so that such transmission bands should have extremely narrow half bandwidths. Even if the peak of transmissivity is high, the transmissivity does not matter as a whole. This is because the transmission bandwidth becomes equal to or narrower than 1 nm when the gap distance is set to be equal to or less than 100 μm, and the FSR is larger than this transmission bandwidth.

Thirdly, in the wavelength bands corresponding to the sloping parts of the wavelength characteristic where the transmissivity of the band-pass filters varies sharply, the finesse varies continuously as the transmissivity varies. By virtue of both effects as band-pass filter and as etalon, the reflectance of the present optical filter as a whole becomes high in the wavelength where the reflectance of band-pass filters is high, thereby providing an optical filter having a transmission characteristic with sharper rising and falling.

Figure 3:
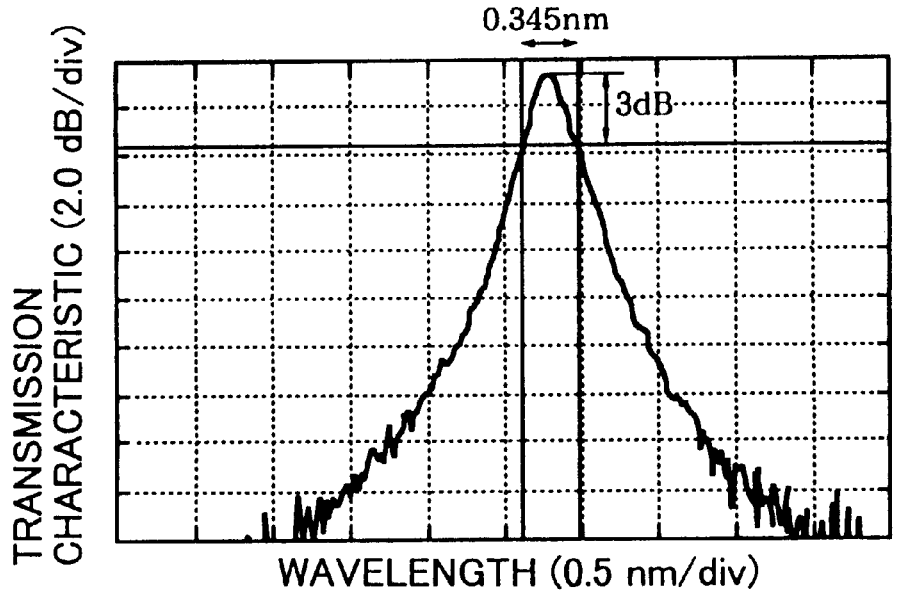
FIG. 3 is a graph of actually measured data, showing a transmission characteristic of one band-pass filter before adhering in the embodiment.
Figure 4:
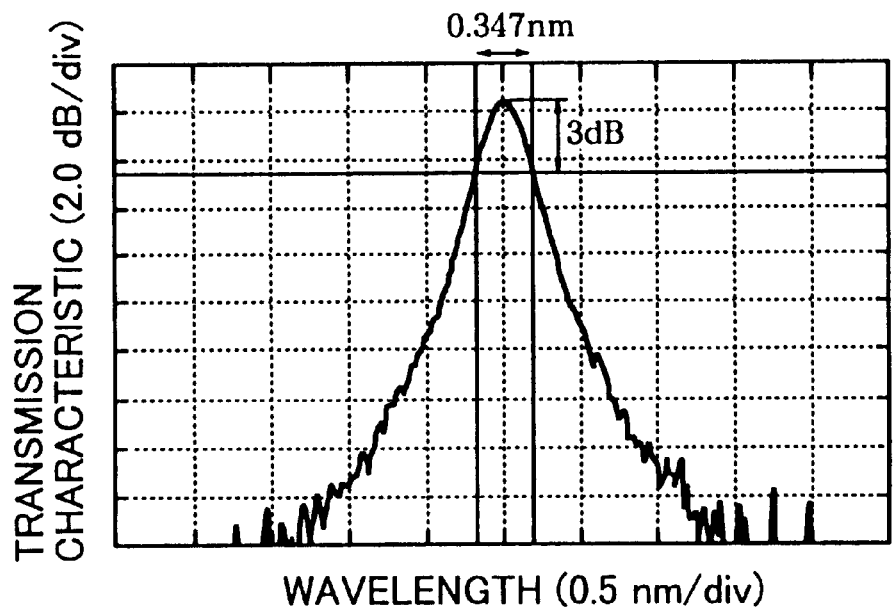
FIG. 4 is a graph of actually measured data, showing a transmission characteristic of the other band-pass filter before adhering in the embodiment.
Figure 5:
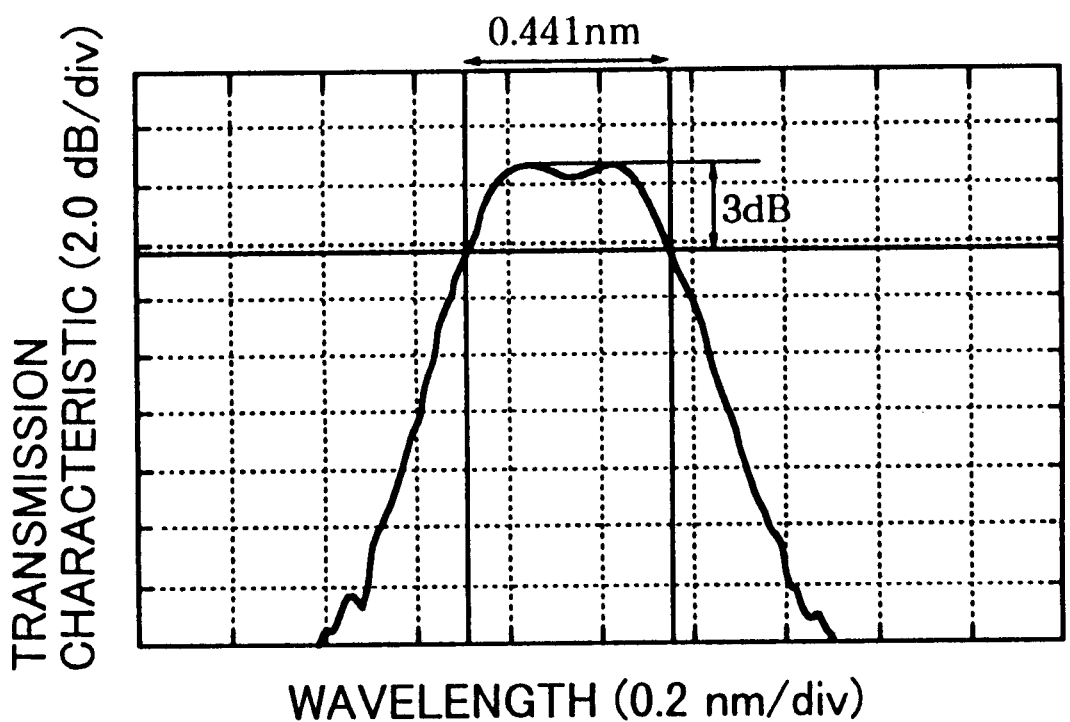
FIG. 5 is a graph of actually measured data, showing a transmission characteristic of the optical filter after adhering the band-pass filters in the embodiment.

FIGS. 3 through 5 show actually measured data of the transmission characteristic. Namely, FIGS. 3 and 4 show transmission characteristics of respective band-pass filters before adhering, and FIG. 5 shows the transmission characteristic of the optical filter after adhering.

The half bandwidth of the transmission band of the band-pass filter shown in FIG. 3 is 0.345 nm, and the half bandwidth of the transmission band of the band-pass filter shown in FIG. 4 is 0.347 nm. When these band-pass filters are adhered with approximately 50μm of gap distance, the half bandwidth of the transmission band is widened to 0.441 nm by virtue of the interference effect as etalon, as shown in FIG. 5. Further, the peak of the transmission band becomes relatively flat, thereby accomplishing an optical filter having a substantially rectangular transmission characteristic.

In the present optical filter, there will periodically appear transmission bands at every FSR as etalon, but this does not matter at all when the bandwidth to be used of the optical filter is narrower than the FSR. To widen the FSR than the bandwidth to be used, it is enough to shorten the distance between two band-pass filters. As one example, supposing the distance is in the order of 50 μm, the FSR to be represented by an equation c/2L (wherein c is the velocity of light, and L is the distance) can be obtained by substituting 50 μm for L, and its value becomes about 15 nm near the wavelength 1.55 μm, thereby obtaining an applicable band satisfactory for many applications. Further, there exists a usage of optical filter where a second transmission band can exist within the band to be used. For example, even if a partial transmission band exists, those optical filters for eliminating noise lights in an Erbium-doped fiber amplifier, can be used in many cases, insofar as the attenuation is averagedly high.

According to the above described manufacturing method, it becomes possible to readily manufacture an optical filter having a flat transmission characteristic and superior cutoff characteristic, making use of an existing process for forming a dielectric multilayer coating. Particularly, band-pass filters having the uniform characteristics can be combined with each other, by selecting those adjacent segments from a band-pass filter coating consisting of a dielectric multilayer coating formed in a single step, so that it becomes possible to manufacture an optical filter having a required characteristic with a high yield.

There will be described hereinafter another method of manufacturing the optical filter having the basic construction shown in FIG. 1.

This manufacturing method is to apply band-pass filters consisting of dielectric multilayer coatings onto both surfaces of a thin glass plate. In this case, it is generally difficult to form dielectric multilayer coatings having uniform characteristics, on the front and back surfaces of a glass plate. However, since extremely high parallelism can be obtained relatively readily, it is useful to form band-pass filters on the front and back surfaces of such a glass plate, particularly aiming at an application which gives weight to a shape of transmission wavelength characteristic of an optical filter. As such, the manufacturing method to be described hereinafter is adapted to readily match the central transmission wavelengths of band-pass filters to be formed on the front and back surfaces of the glass plate, or to readily shift such central transmission wavelengths from each other by a desired quantity.

FIGS. 6(A) to 6(D) are perspective views showing external appearances of products at respective steps, in the aforementioned another manufacturing method.

Figure 6:
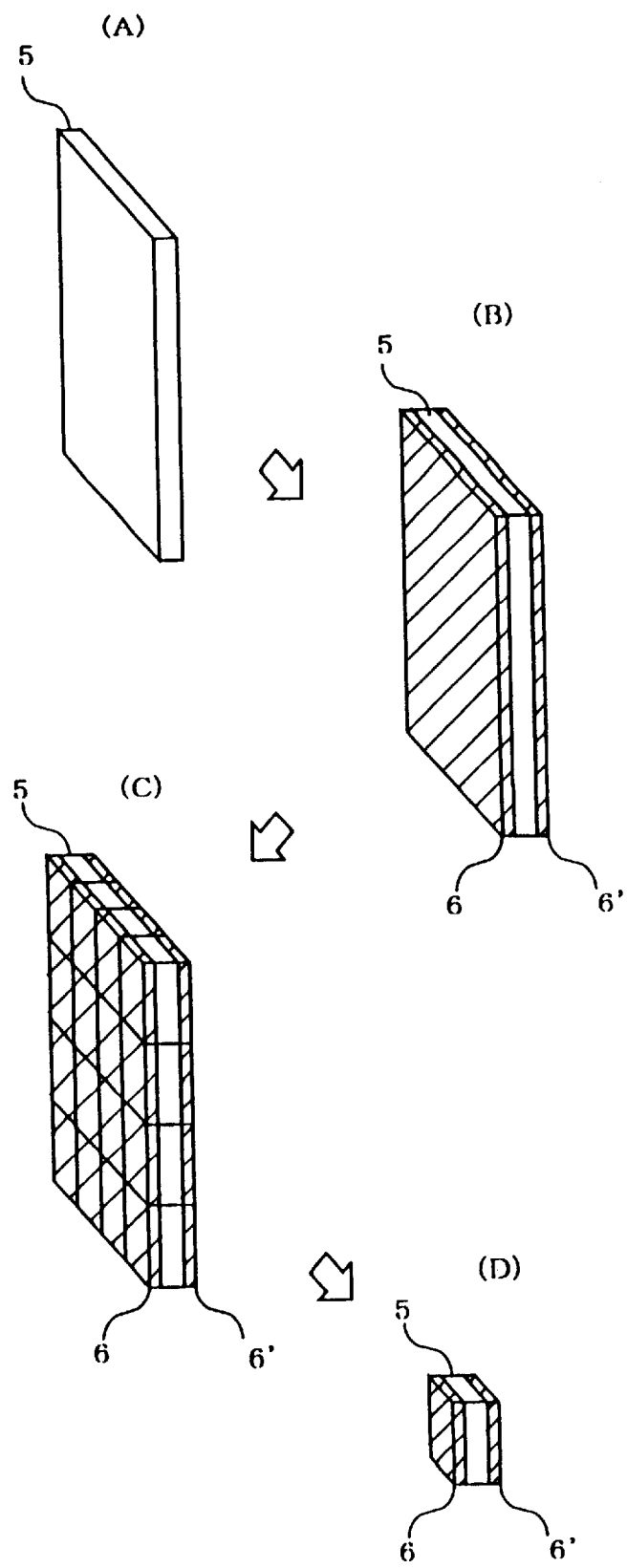
FIGS. 6(A) to 6(D) are perspective views showing external appearances of products at respective steps, in a manufacturing method according to another embodiment of the present invention.

Firstly, there is prepared a transparent glass plate 5 having a thickness such as in the order of 50μm, as shown in FIG. 6(A). There are then formed on the front and back surfaces of the glass plate 5, band-pass filters 6 and 6' consisting of dielectric multilayer coatings, respectively.

Figure 7:
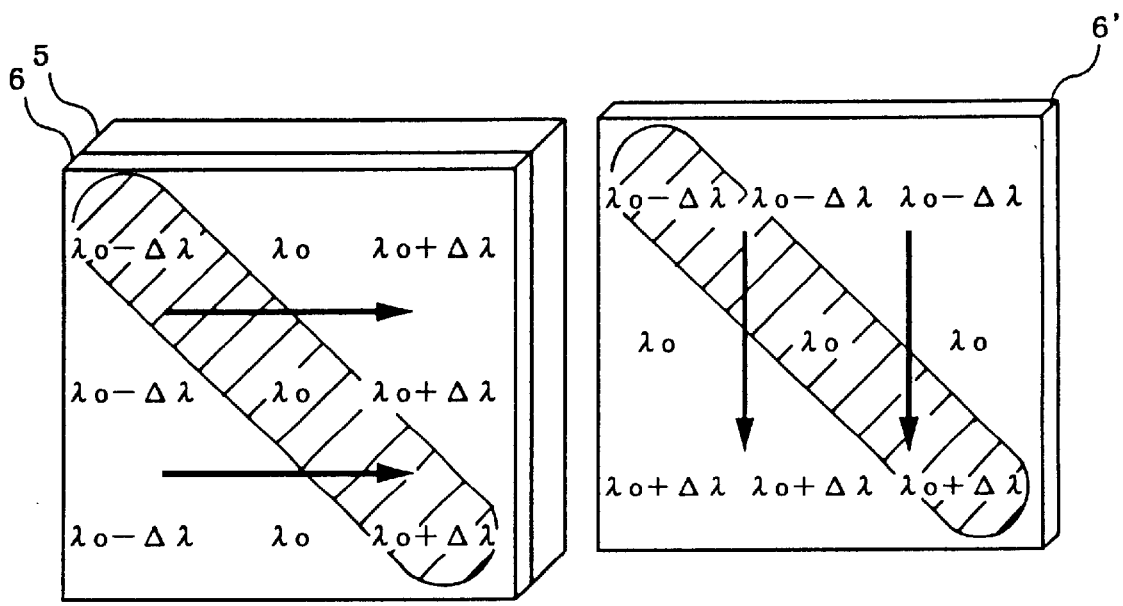
FIG. 7 is a view showing a grading characteristic of a transmission wavelength of band-pass filters manufactured by the manufacturing method according to another embodiment.

As shown in FIG. 7, the band-pass filters 6 and 6' to be formed at this time are rendered to have respective central transmission wavelengths λ varying with directionality (i.e., to have grading characteristic concerning transmission wavelengths) such that the central transmission wavelength varying direction of band-pass filter 6 on the front surface becomes perpendicular to that of the band-pass filter 6' on the back surface.

Generally, in a formation process of band-pass filter, it is a well known technique to evaporate a dielectric multilayer coating such that its central transmission wavelength of the band-pass filter is varied site by site, i.e., the coating is rendered to have a distribution of central transmission wavelength. It is also known to make the central transmission wavelength to have directionality, by changing the evaporation conditions, and such a technique has been practiced in fact. Concretely, such a technique includes arranging the glass plate 5 in an inclined manner during evaporation, or changing the evaporation condition such as making use of a shutter.

By applying the band-pass filters having directional distributions concerning the central transmission wavelengths onto the front and back surfaces of the single glass plate 5 such that the distributional directions become perpendicular to each other, those areas of the front and back surfaces in which the central transmission wavelengths coincide with each other are distributed in a specific direction, as shown by dashed regions in FIG. 7.

Then, there can be readily obtained an optical filter having a required transmission characteristic, by dividing the glass plate 5 applied with the band-pass filters 6 and 6' into a plurality of segments as shown in FIG. 6(C), and then selecting a segment having a desired resultant central transmission wavelength from those segments having coinciding central transmission wavelengths. It is also readily possible to select an optical filter, the band-pass filters on the front and back surfaces of which have central transmission wavelengths offset from each other by a desired quantity. FIG. 6(D) shows an optical filter as selected.

Further, according to the above manufacturing method, it is also readily possible to obtain optical filters having a series of central transmission wavelengths, from the single glass plate 5. As such, the above described manufacturing method is particularly useful such as in a wavelength division multiplexing optical communication in which a number of optical filters having continuous central transmission wavelengths are required.

What we claimed are:

1. A method of manufacturing an optical filter having two band-pass filters consisting of dielectric multilayer coatings, the optical surfaces of the filters being substantially parallely arranged to each other, comprising:

forming a band-pass filter coating consisting of a dielectric multilayer coating on one plane of a transparent substrate;

dividing said transparent substrate into a plurality of segments; and adhering at least two segments selected from said plurality of segments by means of a transparent adhesive to form an optical filter, wherein respective surfaces of said band-pass filter coatings are faced to each other and are rendered to be substantially parallel to each other with a predetermined distance therebetween.

2. A method of manufacturing an optical filter of claims 1, wherein said adhering of at least two segments includes selecting two adjacent segments from said plurality of segments.

3. A method of manufacturing an optical filter of claim 1, further comprising:

forming an antireflection coating on the other plane of said substrate, wherein said dividing of said transparent substrate includes dividing said substrate formed with said band-pass filter coating consisting of the dielectric multilayer coatings and formed with said antireflection coating, into the plurality of segments.

4. A method of manufacturing an optical filter of claim 1, wherein said adhering of the at least two segments includes adhering said selected two segments with a transparent thin plate interposed therebetween.

5. A method of manufacturing an optical filter of claim 1, wherein said adhering of the at least two segments includes setting said predetermined distance between said band-pass filter coatings consisting of dielectric multilayer coatings of said selected two segments, to be equal to or less than 100 μm.

6. A method comprising:

forming a band-pass filter coating consisting of a dielectric multilayer coating on one plane of a substrate;

dividing said substrate into a plurality of segments; and adhering at least two segments selected from said plurality of segments by means of a transparent adhesive to form an optical filter, wherein respective surfaces of said band-pass filter coatings are faced to each other and are rendered to be substantially parallel to each other with a predetermined distance therebetween.

* * * * *